United States Patent
Shi et al.

(10) Patent No.: US 9,554,373 B2
(45) Date of Patent: Jan. 24, 2017

(54) METHODS AND APPARATUSES FOR PROCESSING UPLINK DATA

(71) Applicant: TELEFONAKTIEBOLAGET L M ERICSSON (PUBL), Stockholm (SE)

(72) Inventors: Nianshan Shi, Jarfalla (SE); Anders Forssell, Uppsala (SE); Martin Israelsson, Spanga (SE); Francisco Manzano, Stockholm (SE); Jose Luis Pradas, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/437,348

(22) PCT Filed: Sep. 19, 2013

(86) PCT No.: PCT/SE2013/051097
§ 371 (c)(1),
(2) Date: Apr. 21, 2015

(87) PCT Pub. No.: WO2014/070071
PCT Pub. Date: May 8, 2014

(65) Prior Publication Data
US 2015/0289256 A1    Oct. 8, 2015

Related U.S. Application Data

(60) Provisional application No. 61/720,083, filed on Oct. 30, 2012.

(51) Int. Cl.
*H04W 4/00* (2009.01)
*H04W 72/04* (2009.01)
(Continued)

(52) U.S. Cl.
CPC ......... *H04W 72/0413* (2013.01); *H04W 28/26* (2013.01); *H04W 48/08* (2013.01); *H04W 74/006* (2013.01); *H04W 88/08* (2013.01)

(58) Field of Classification Search
CPC .. H04W 28/26; H04W 48/08; H04W 72/0413; H04W 72/0433; H04W 88/08; H04W 88/12
See application file for complete search history.

(56) References Cited

U.S. PATENT DOCUMENTS 6,996,081 B1 * 2/2006 Brouwer ............... H04W 24/02
370/252
8,619,687 B2 * 12/2013 Choudhury ....... H04W 72/0426
370/329
(Continued)

FOREIGN PATENT DOCUMENTS

EP   2009943 A1   12/2008
EP   2046089 A2   4/2009
(Continued)

OTHER PUBLICATIONS

3GPP, "3rd Generation Partnership Project; Technical Specification Group Radio Access Network; UTRAN lub interface user plane protocols for Common Transport Channel data streams (Release 10)", 3GPP TS 25.435 V10.4.0, Dec. 2011, 1-61.
(Continued)

*Primary Examiner* — Kan Yuen
(74) *Attorney, Agent, or Firm* — Patents on Demand, P.A.; Brian K. Buchheit; Scott M. Garrett

(57) ABSTRACT

Base stations and Radio Network Controllers, RNCs, and methods in such devices are disclosed. A base station (18) sends access indications to a RNC (20) indicating assignments and/or releases of common uplink resources. The RNC (20) uses the access indications received from the base station (18) to differentiate between successive accesses on the common uplink resources by a same User Equipment, UE (22), and to correspondingly differentiate between the (Continued)

processing of given data frames from the UE (22) as belonging to one or other of the successive accesses.

11 Claims, 7 Drawing Sheets

(51) Int. Cl.
    *H04W 74/00*     (2009.01)
    *H04W 28/26*     (2009.01)
    *H04W 48/08*     (2009.01)
    *H04W 88/08*     (2009.01)

(56) References Cited

U.S. PATENT DOCUMENTS

| | | |
|---|---|---|
| 2005/0281232 A1 | 12/2005 | Kim et al. |
| 2009/0086671 A1 | 4/2009 | Pelletier et al. |
| 2012/0287868 A1* | 11/2012 | Sambhwani .......... H04L 1/1887 370/329 |

FOREIGN PATENT DOCUMENTS

| | | |
|---|---|---|
| EP | 2590469 A1 | 5/2013 |
| WO | 2009055536 A2 | 4/2009 |
| WO | 2009082329 A2 | 7/2009 |
| WO | 2009123544 A1 | 10/2009 |
| WO | 2010093302 A1 | 8/2010 |
| WO | 2012093138 A1 | 7/2012 |
| WO | 2013023835 A1 | 2/2013 |

OTHER PUBLICATIONS

3GPP, "3rd Generation Partnership Project; Technical Specification Group Radio Access Network; UTRAN Iur interface user plane protocols for Common Transport Channel data streams (Release 10)", 3GPP TS 25.425 V10.2.0, Dec. 2011, 1-49.

* cited by examiner

US 9,554,373 B2

METHODS AND APPARATUSES FOR PROCESSING UPLINK DATA

TECHNICAL FIELD

The present disclosure is generally related to wireless communications networks, and is more particularly related to techniques for data processing in nodes of such networks.

BACKGROUND

The term "E-DCH" refers to the Enhanced Dedicated Channel provided in wireless communication networks configured according to 3GPP UMTS standards—where "3GPP" refers to the Third Generation Partnership Project and "UMTS" denotes the Universal Mobile Telecommunications Service, as defined by the relevant 3GPP Technical Specifications.

The E-DCH is a transport uplink channel and, among other things, the E-DCH provides for random access transmissions by User Equipments, "UEs" operating in the CELL_FACH state. In particular, the network uses a pool of common E-DCH resources that can each be temporarily assigned to a UE in CELL_FACH state. In the current standard, there are up to 256 Radio Network Temporary Identifiers or "RNTIs" used for differentiating UEs making random accesses on the E-DCH within a cell, and a maximum of 32 random access preambles defining a maximum of 32 individual common E-DCH resources that can be allocated to respective individual UEs at any given time.

To transmit on a common E-DCH resource, a UE begins transmitting a random access preamble using a transmit power ramping. The NodeB—a base station in the UMTS vernacular—detects the random access preamble and allocates an available common E-DCH resource. The controlling NodeB—a UMTS base station—allocates individual ones of the common E-DCH resources to UEs attempting random access transmissions on the E-DCH, with the allocated resources subsequently being released back into the pool.

Data frames transmitted by UEs on common E-DCH resources are received at the supporting NodeB and passed along to the associated Radio Network Controller or "RNC". Each UE uses Transmission Sequence Numbers, "TSNs", to identify the sequence of data frames transmitted in each access of the common E-DCH resources. The RNC performs data re-ordering as needed based on the TSN of the data frames received from a given UE and it differentiates between the data frames received from different UEs based on the E-RNTI.

According to the 3GPP Technical Specification identified as TS 25.435 (see e.g. version 10.4.0), a UE that has been allocated a common E-DCH resource must reset its MAC-is when releasing that resource, and must also reset its TSN counter to zero for all logical channels mapped to the E-DCH. Here, the term "MAC-is" denotes one of the Medium Access Control entities within the UE that control access to the E-DCH. Accordingly, the UE resets its TSN counter for each access it makes on the common E-DCH resources in the CELL_FACH state, meaning that the TSN of the first MAC-is Protocol Data Unit, "PDU", transmitted in any given access is set to zero and incremented for each successive data frame transmitted in that same access.

The NodeB of the involved cell controls the contention-based accesses of the common E-DCH resources in the cell. In particular, the NodeB assigns one of the common E-DCH resources to a given UE for a given random access by that UE. The allocated resource is subsequently released—either by the UE or based on expiry of an allocation timer—and thus becomes available for a subsequent random access by the same UE or any other UE operating in the cell.

There are several potential challenges arising from the above arrangement and operation. For example, TSN values range from 0 to 63, meaning that a UE transmitting more than sixty-four data frames within the same access will reuse one or more of the TSN values used for data reordering at the RNC. Further, while the RNC can distinguish between data frames from different UEs, based on the different E-RNTIs assigned to those UEs, the RNC cannot necessarily distinguish between the data frames sent from the same UE in two successive accesses.

As a particular example, a given UE is allocated common E-DCH resources for a given random access, referred to as a "first" access, those resources are released by the first UE upon completion of the first access, and the UE makes an immediate or almost immediate second random access on the common E-DCH resources. The E-RNTI seen by the RNC will be the same for the first and second accesses. Moreover, the TSN numbering will start at zero for the data frames received at the RNC for the first access and for those received for the second access.

Thus, because the RNC does not know when common E-DCH resources are allocated or released, it is recognized herein that there is a possibility of the RNC confusing data between successive random accesses by a UE on the common E-DCH resources. Particularly, data reordering at the RNC relies on use of a certain timer, wherein the RNC "waits" on a packet missing from an overall sequence of patents until expiry of a "T1" timer. Now, during the run time of the T1 timer, the UE associated with the missing packet might end its data transmission and release the involved common E-DCH resource. If that same UE makes a subsequent random access within the timing window of T1, the RNC may receive a data frame in the second access that has the same E-RNTI and TSN value of the data frame missing from the prior access.

For example, assume that a UE has sent ten data packets with TSNs of 0 to 9 and then releases the common E-DCH resource used for that access. Further, assume that the RNC has not received the TSN=4 data packet from that access. If the UE initiates another random access data transmission on the E-DCH, data transmissions for that subsequent access will start with TSN=0. If the UE sends five or more data packets, the RNC will see a data frame having TSN=4 from this subsequent access but will not be able to differentiate it from the TSN=4 data frame missing from the immediately prior access by the same UE. The result will be that the RNC mixed up data from two different data transmissions because it cannot distinguish between different accesses by the same UE.

SUMMARY

In one embodiment, a method of data processing at a Radio Network Controller (RNC) configured for operation in a wireless communication network includes receiving access indications from a base station. The access indications indicate allocations and/or releases of common uplink resources used for random access transmissions by User Equipments (UEs) to the base station. Correspondingly, the RNC uses the indications to differentiate between successive accesses by a same UE on the common uplink resource, and to correspondingly differentiate the processing of given data frames from the UE as belonging to one or other of the successive accesses.

In another embodiment, a method of data processing at a base station configured for operation in a wireless communication network includes assigning given UEs to given common uplink resources, as needed, for random access transmissions by the UEs, and sending data frames from the random access transmissions to the RNC. Further, the method includes sending access indications to the RNC, indicating assignments and/or releases of the common uplink resources, so as to enable the RNC to differentiate between two successive accesses by a same UE.

In yet another embodiment, a method of data processing at a RNC includes receiving an incomplete sequence of data frames from a UE that transmitted on a first access of common uplink resources and receiving a subsequent data frame for a second access by the UE on the common uplink resources. The subsequent data frame has a sequence number corresponding to a missing data frame from the first access. The method further includes determining whether the subsequent data frame belongs to the first access or the second access, based on one or more indications received from a base station responsible for allocating the common uplink resource. The indications indicating new assignments and/or releases of the common uplink resource.

Additional embodiments include RNCs and base stations adapted to perform methods as recited above.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
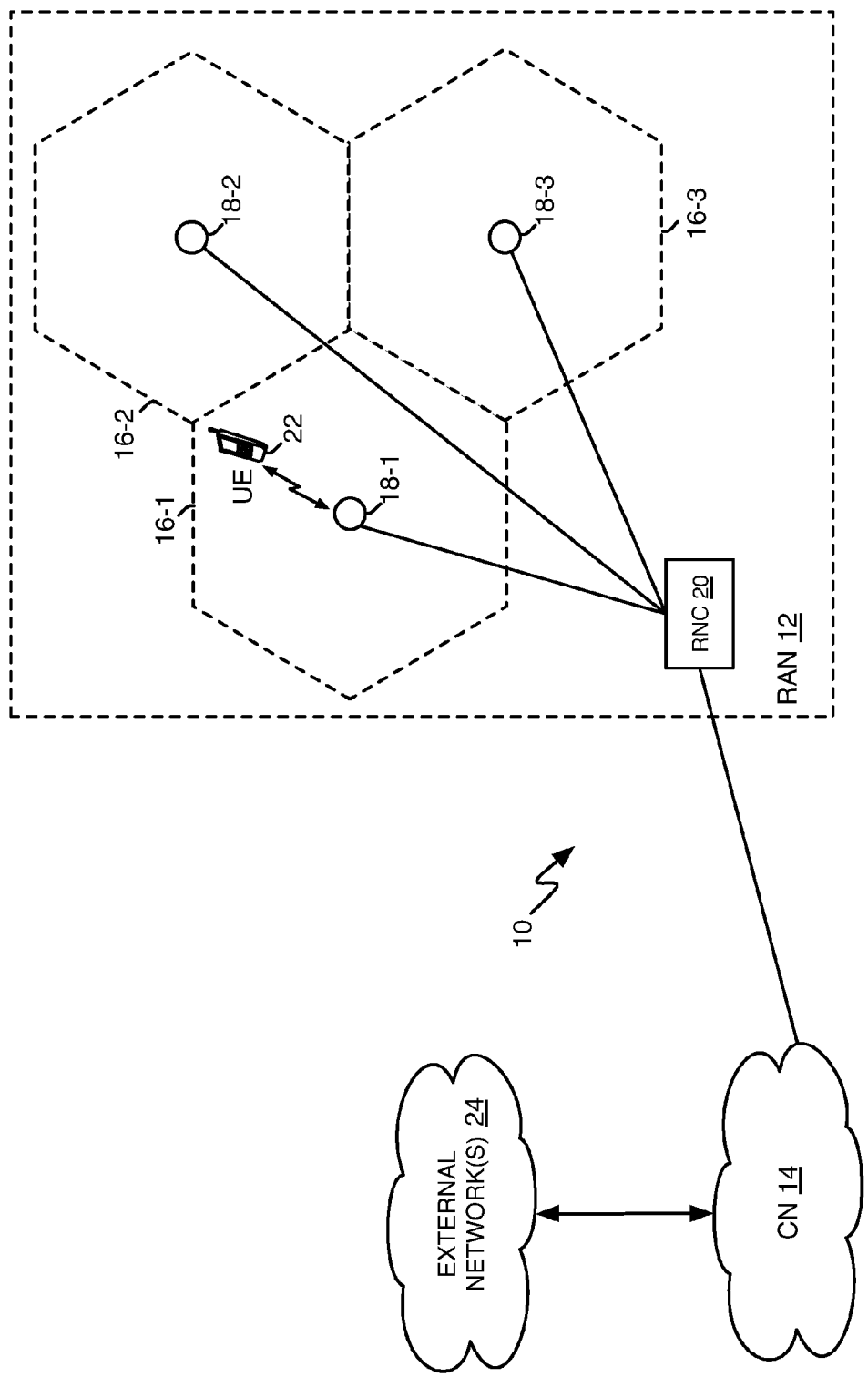
FIG. 1 is a block diagram illustrating an example wireless communication network.

FIG. 1 illustrates an example wireless communication network 10, which includes a Radio Access Network or "RAN" 12 that is communicatively coupled to a Core Network or "CN" 14. In an example embodiment, the network 10 comprises a UMTS network operating with an Enhanced Uplink or "EUL" that provides random access service on an E-DCH in each cell 16 of the network 10. Merely as an example for discussion, three cells 16 are shown, denoted as cells 16-1, 16-2 and 16-3. Base stations 18-1, 18-2 and 18-3 provide service in the respective cells 16-1, 16-2, and 16-3. In the UMTS example, each base station 18 comprises a NodeB.

A Radio Network Controller or "RNC" 20 communicatively couples wireless communication devices 22—referred to as User Equipments, "UEs", herein—to the CN 14, which in turn provides communication connections between UEs 22 within the network 10 and/or to other devices or systems in one or more external networks 24, such as the Internet. One or more of the base stations 18 are configured according to the teachings herein, to provide the RNC 20 with indications of different accesses on the common E-DCH resources in the corresponding cell(s) 16. Correspondingly, the RNC 20 is configured to differentiate between different accesses by the same UE based on those indications. Such operation advantageously allows the RNC 20 to differentiate data sent from a UE 22 on a subsequent random access of a given common E-DCH resource from data that is still pending at the RNC 20 for a prior random access by that same UE.

An access on the Enhanced Uplink in CELL_FACH state is defined as:

A UE 22 performs a new random access procedure initiated by a preamble cycle. When the base station 18 has detected the preamble and sent an acknowledgement to the UE 22, the UE 22 starts to transmit its message, either signaling or data, to the network 10.

The data frames are received by a MAC-is entity (per E-RNTI) in the RNC 20. The MAC-is entity is herein provided with a mechanism for distinguishing a "first" random access identified by a given E-RNTI or other UE identifier from a subsequent random access made using the same identifier. Such operation among other things addresses the scenario where the RNC 20 has data still "pending" from one random access by a UE 22 when it receives data from the same UE making a subsequent random access. Here, "pending" denotes, for example a missing Protocol Data Unit (PDU) for which reception at the RNC 20 has not yet timed out.

In more detail, consider the case where the RNC 20 receives one or more PDUs (or data frames) for a first random access by a UE 22 transmitting on an allocated common E-DCH resource and assume that one of the PDUs belonging to that access is missing. This scenario follows two possible paths. As a first possibility, no further data is received from the UE while the MAC-is is waiting for the data missing in the first access. Consequently, the re-ordering timer, the "T1" timer at the RNC 20, expires and the already-received data for the first access is forwarded to the Radio Link Control, "RLC", protocol layer and the associated buffers in the RNC 20 are flushed—this process may be referred to as a "Flush & Reset."

As a second possibility, and one advantageously addressed herein, the UE 22 makes a new random access on the E-DCH while the RNC 20 is still waiting on the data missing from the prior "first" access—this new access may be referred to as the "second" access. In this case, the RNC 20 will have received one or more access indications from the supporting base station 18, and it will use the received access indication(s) to differentiate between the first and second accesses, and to avoid confusing data received from the second access with any data missing from the first access, regardless of whether a data frame received at the RNC 20 for the second access has a TSN value that matches that of a data frame still pending for the first access.

As noted, this advantageous recognition at the RNC 20 is based on the involved base station 18 sending "access indications" to the RNC 20. Several examples of such indications are detailed herein for purposes of illustrating relevant operations at the base station 18 and the RNC 20. Broadly, the access indications indicate when common E-DCH resources are assigned for random access and/or indicate when such resources are correspondingly released.

The access indications are sent, e.g., by reusing existing Information Element "IE" fields. Generally, the access indications are included in the Iub/Iur user plane or NBAP/RNSAP control plane. As a UE 22 in the CELL_FACH state does not have dedicated radio links, it may be advantageous to include access indications in the Iub/Iur user plane frame protocol.

With this point in mind, one embodiment contemplated herein reuses the existing Propagation Delay, "PD", IE, which is included in the Iub Frame Protocol, to send access indications to the RNC 20, which allow it to distinguish between different accesses by the same UE 22 on common E-DCH resources. This approach requires that actual PD information be sent only once for each random access by a UE in CELL_FACH state.

Thus, each receipt of a PD IE at the RNC serves as an indication of a new random access. Conversely, receipt of further data frames for the same E-RNTI without receiving PD IEs will be interpreted as a continuation of the most recent random access (subject of course to any normal time-out qualifications, or other protocol controls). The presence (or absence) of the PD IE thus serves as an implicit indicator to the RNC 20 as to whether a data frame from a given UE 22 belongs to one access or another. That is, signaling of the PD IE by the base station 18 allows the RNC 20 to differentiate between a first access on a common E-DCH resource by a UE 22 in the CELL_FACH state, and a subsequent second access by that same UE 22.

In more detail, the MAC-is shall use the Propagation Delay (PD) information as follows: if PD is included in a data frame, the MAC-is considers that data frame as coming from a new EUL-FACH access; and if PD is not included, then MAC-is consider the data frame as belong to a current or prior EUL-FACH access. To better understand this operation, consider that the current usage of the PD IE conventionally is as follows: in the random access procedure the base station 18 measures the PD; when the base station 18 has correctly detected the preamble from a given UE 22 and sent an ACK to the UE 22, the received data frame is forwarded to the RNC 20 over the Iub Frame Protocol; the base station 18 includes the PD in that frame; the PD also might be included in a subsequent correctly decoded data frame for the same access, at least in a high load scenario.

Thus, according to the teachings herein for this embodiment, the base station 18 shall ensure that it includes the PD only in the first data frame from each separate EUL-FACH access. Further, the MAC-is in the RNC 20 is configured so that it shall always flush and reset all data in the buffers at reception of a data frame that includes the PD. That is, if MAC-is is waiting to receive missing data from a given random access, it shall ensure that a new incoming data frame from a new random access by a UE 22 is not mixed with data from the previous random access by the same UE 22. This operation is achieved by sending all existing data in the buffers to the RLC (i.e. a flush) and then resetting those buffers responsive to reception of a PD.

The conventional definition for the Iub Frame Protocol as given in TS 25.435 can be updated to reflect this new usage of the PD IE, such as by adding explanatory text saying, "The presence of the PD IE will indicate a new common E-DCH resource access." From Section 6.2.7.5 of the TS, the PD for Frequency Division Duplex or "FDD" mode is described as follows: one-way radio interface delay as measured during RACH access. If the measured value exceeds the range of this information element, the information element shall be set to its maximum value, and the Ext Propagation Delay IE shall be used to represent the measured value, see subclause 6.2.7.5A."

As taught herein for such embodiments, the presence of the PD IE will indicate a new common E-DCH resource access. The value range of the PD IE is {0 . . . 765 chips}, its field length is 8 bits, and it has a granularity of 3 chips. From Section 6.2.7.5, the Ext Propagation Delay [FDD] is defined as the extended part of the one-way radio interface delay as measured during RACH access. This IE shall be present only if the range of the Propagation Delay IE is insufficient to represent the measured value. Thus, in one or more embodiments, the presence of this IE will indicate a new access for any given common E-DCH resource. The value range of this IE is {0-3069 chips}, and values 0-765 are not used. The granularity is 3 chips and the field length is 10 bits.

In another example embodiment, the base station 18, which knows when a common E-DCH resource is released, indicates the occurrence of such releases to the RNC 20. In other words, the RNC 20 receives access indications that indicate whenever a given UE 22 releases its assigned common E-DCH resource. The RNC 20 thus recognizes data transmissions associated with separate, successive first and second random accesses by the same UE 22 based on receiving a release indication for the first release.

Figure 2:
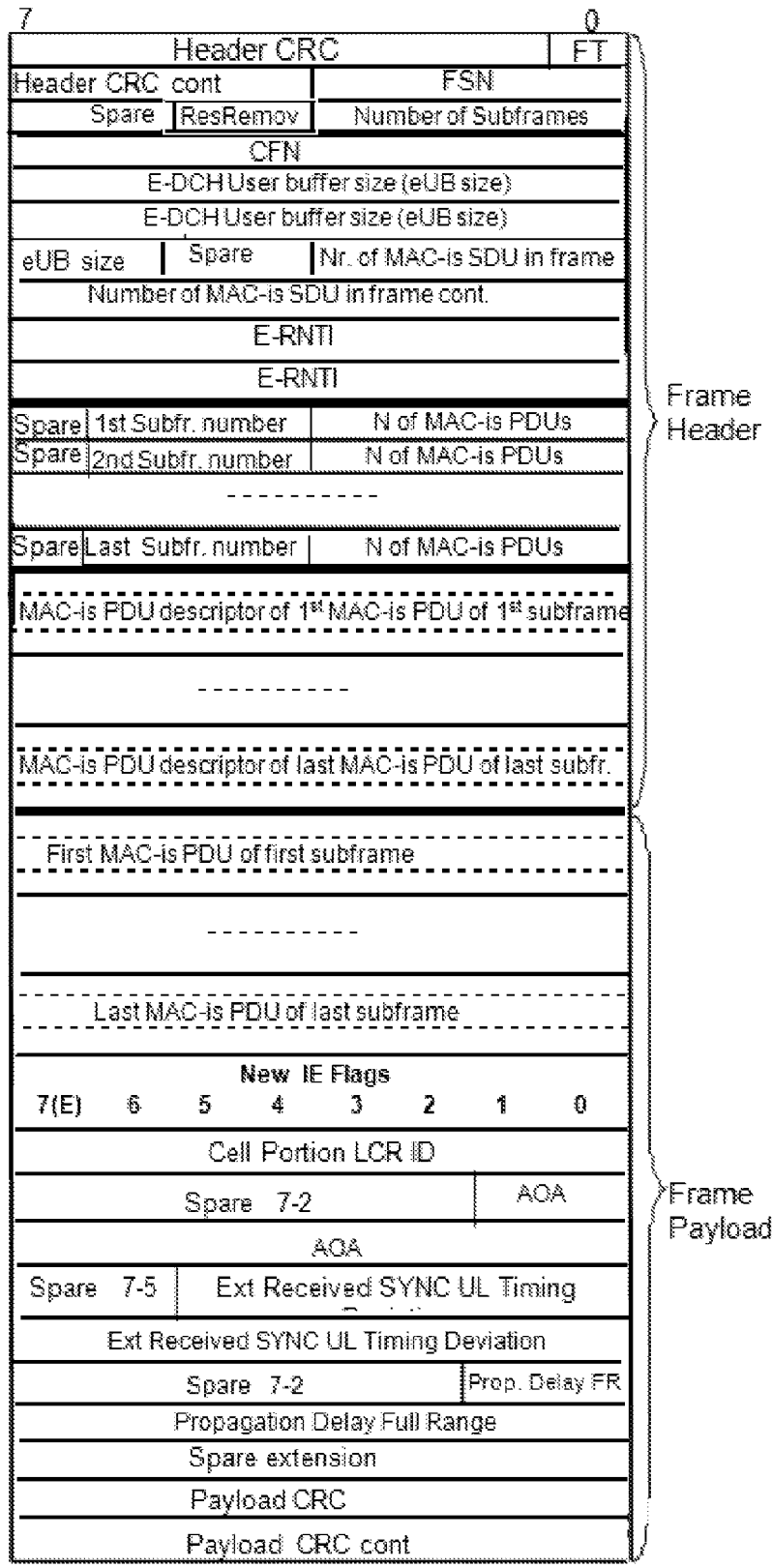
FIGS. 2 and 3 are message charts illustrating contents of different embodiments of data frames.

For example this "release" form of the access indication is sent at the last E-DCH data frame in a given random access, or as a separate data frame in the frame protocol set forth in TS 25.435. The indication can be introduced in the spare bit(s) in the Header or in another place, or in the spare extension. Refer to FIG. 2, where the access indication is introduced in the spare bit in the header of the E-DCH DATA FRAME. The "new" Resource Removal IE (ResRemov) has, for example, the value of 0 or 1, with the value of "1" being used to indicate the release of a common E-DCH resource.

Yet another embodiment introduces an index for each common E-DCH resource. Using the maximum of thirty-two common E-DCH resources currently defined, there would be thirty-two index values. Thus, when a given common E-DCH resource is released, the base station 18 indicates that release to the RNC 20 using the corresponding resource index, e.g. accompanied by a flag or logical indicator indicating the assigned or released state of the common E-DCH resource identified by the index.

For example, two new fields, cEdchResourceIndex and cEdchToggle, are introduced in the Frame Protocol defined in TS 25.435 for access indication purposes. The new fields can be conveyed in the spare bits in the Header or another place, or in the spare extension.

Figure 3:
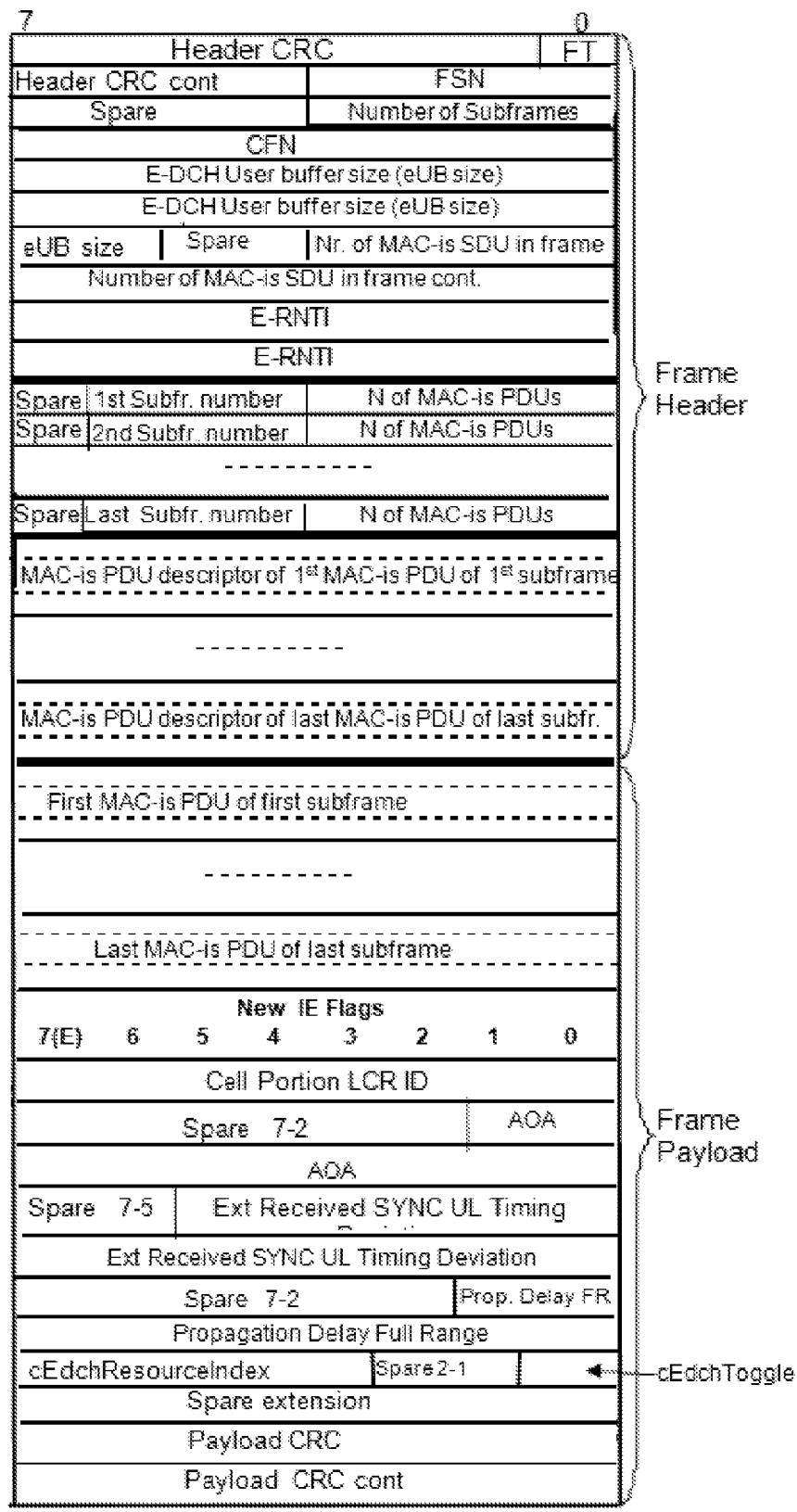

Refer to FIG. 3, which illustrates the example case where the new fields are introduced in the spare extension of the E-DCH DATA FRAME. One octet is allocated from the Spare extension. The new cEdchResourceIndex and cEdchToggle are carried in that octet. There are two spare bits for future expansion of the common E-DCH resource indexing range. A new IE flag is used in at least one such embodiment, for indicating the presence of these two new IEs, e.g., in the "New IE Flags" field.

The cEdchResourceIndex may be defined as 5 bits providing a range [0 . . . 31], to denote the particular index of a given common E-DCH resource used in a given random access on the E-DCH. The cEdchToggle may comprise 1 bit providing an indication range of [0 . . . 1]. The value of cEdchToggle as sent for a given eDchResourceIndex indicates whether the corresponding E-DCH resource has been released. For example, if cEdchToggle is set to "1" for a specific cEdchResourceIndex received in the RNC 20, the RNC 20 recognizes that the common E-DCH resource identified by the value of eDchResourceIndex has been released. Such recognition is performed by the MAC-is entity in the RNC 20. Notably, while such examples are given in the context of the Iub Frame protocol of TS 25.435, similar changes can apply to the Iur Frame protocol as defined in TS 25.425 (see e.g version 10.2.0).

Figure 4:
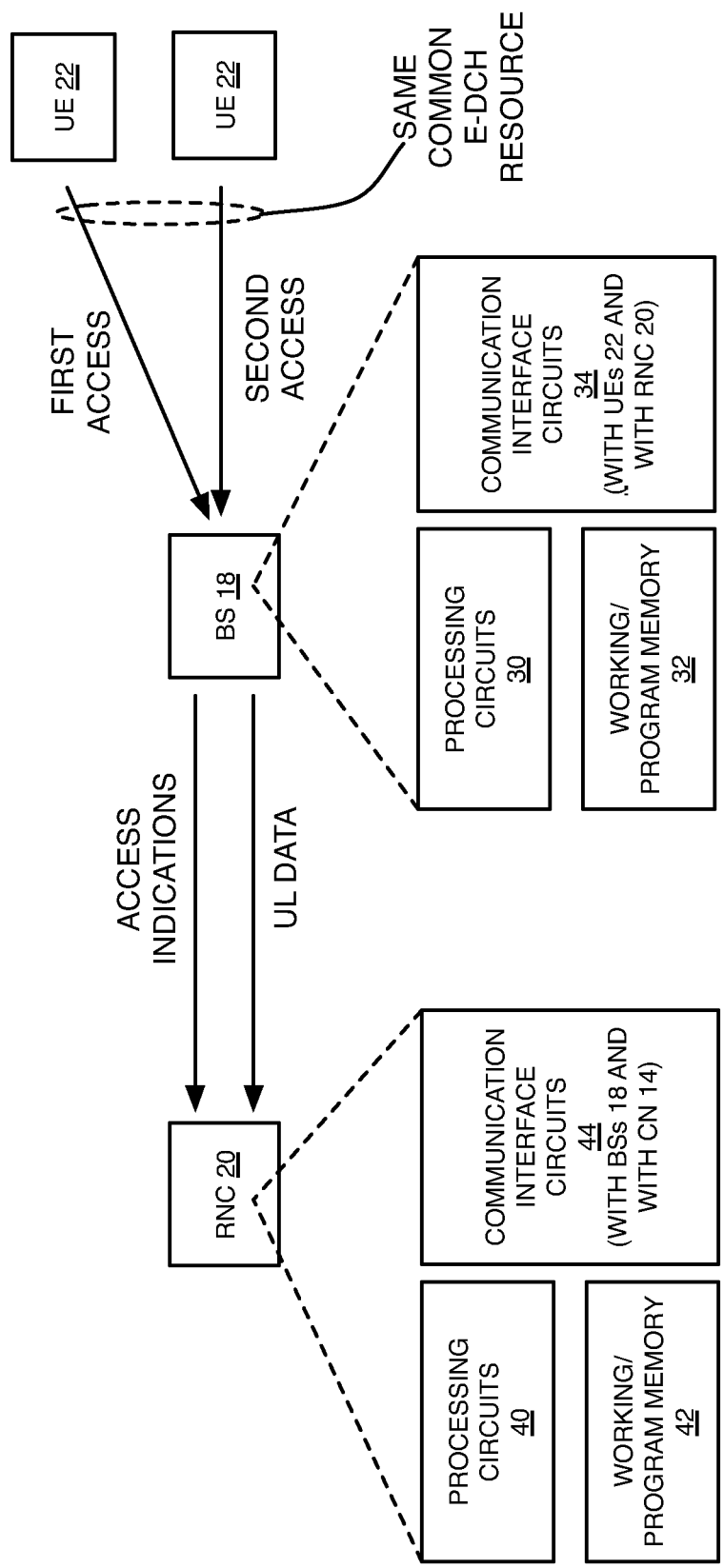
FIG. 4 is a combined signaling diagram/block diagram illustrating an exchange of signals between nodes in an embodiment of a network together with exemplary structures of nodes in the network.

This implementation, any of the previously described implementations, and any variations of them are implemented in the RNC 20 and at least one of the base stations 18 by appropriately configured processing circuitry. For example, such circuitry may be fixed or programmable circuitry or some combination of both. This configuration flexibility exists at both the RNC 18 and the base station 18. FIG. 4 illustrates an example case.

One sees the same UE 22 making a first and a second (subsequent) access on the same common E-DCH resource. The base station 18 (abbreviated as "BS" in the illustration) sends the uplink data frames for both accesses to the RNC 20, but additionally sends one or more access indications associated with the allocation and/or release of the common E-DCH resource used for both accesses. Thus, the one or more access indications sent by the base station 18 allows the RNC 20 to differentiate between the first and second accesses, even though the same E-RNTI identifies both accesses and even if the second access includes a data frame having a TSN equal to that of a pending (missing) data frame belonging to the first access.

In more detail, one sees that the base station 18 includes one or more microprocessors, DSPs, FPGAs, ASICs, or other digital processors that are generally referred to as "one or more processing circuits 30." The processing circuits 30 are operatively associated with (or integrate) working/program memory 32, which may comprise more than one memory circuit or other device, e.g., for volatile and/or non-volatile storage.

In at least one embodiment, the processing circuits 30 are configured to provide the access indications to the RNC 20 based on executing computer program instructions stored in the working/program memory 32, or some other computer-readable medium in the base station 18. Further, the processing circuits 30 are operatively associated with one or more communication interface circuits 34, which include air interface circuits (RF transceiver circuitry) for communicating with UEs 22 and an RNC interface for communicating with the RNC 20.

Further, the RNC 20 in this example includes one or more processing circuits 40, working/program memory 42 (and/or other computer-readable medium), and one or more communication interfaces 44. As with the base station 18, the one or more processing circuits 40 of the RNC 20 comprise, for example, one or more microprocessors, DSPs, ASICs, FPGAs, or other digital processing circuitry, which is/are configured to carry out the RNC-side processing disclosed herein based on the execution of computer program instructions stored in the working/program memory 42, or stored in other computer-readable medium accessible to the processing circuits 40.

As will be understood, the processing circuits 40 are operatively associated with the communication interface circuits 44, which include an interface to the base stations 18 and further include one or more core network interfaces. In this configuration, the processing circuits 40 are configured to implement a method of data processing, such as shown in FIG. 5 or 7.

Figure 5:
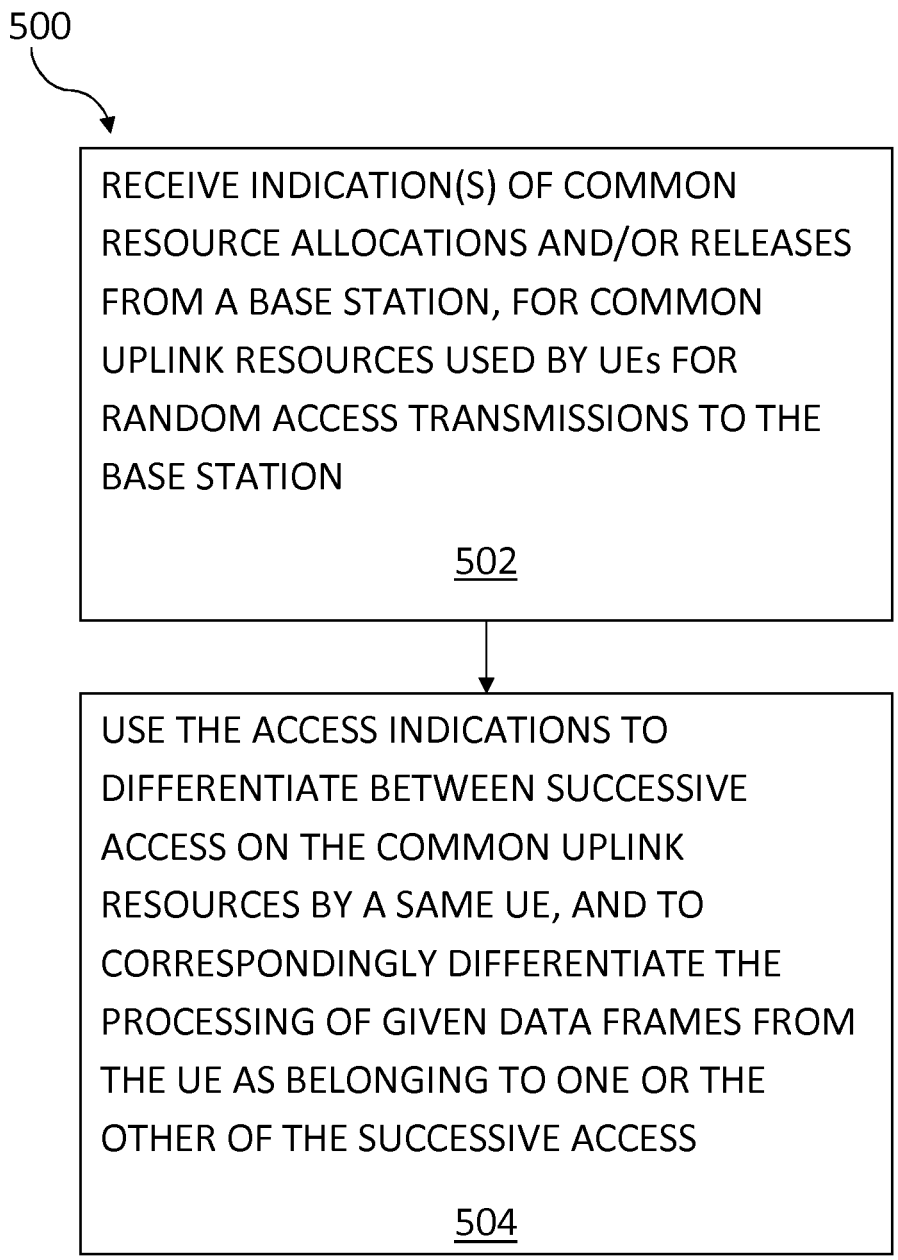
FIG. 5 is a flowchart illustrating an embodiment of a method in a RNC.

The method 500 shown in FIG. 5 includes receiving access indications from a base station 18 in the wireless communication network 10, the access indications indicating allocations and/or releases of common uplink resources for random access transmissions by UEs 22 to the base station 18 (Block 502). The method 500 further includes using the access indications to differentiate between successive accesses by a same UE 22 on the common uplink resources, and to correspondingly differentiate the processing of given data frames from the UE 22 as belonging to one or the other of the successive accesses, i.e. the first access or the second access (Block 504).

Figure 7:
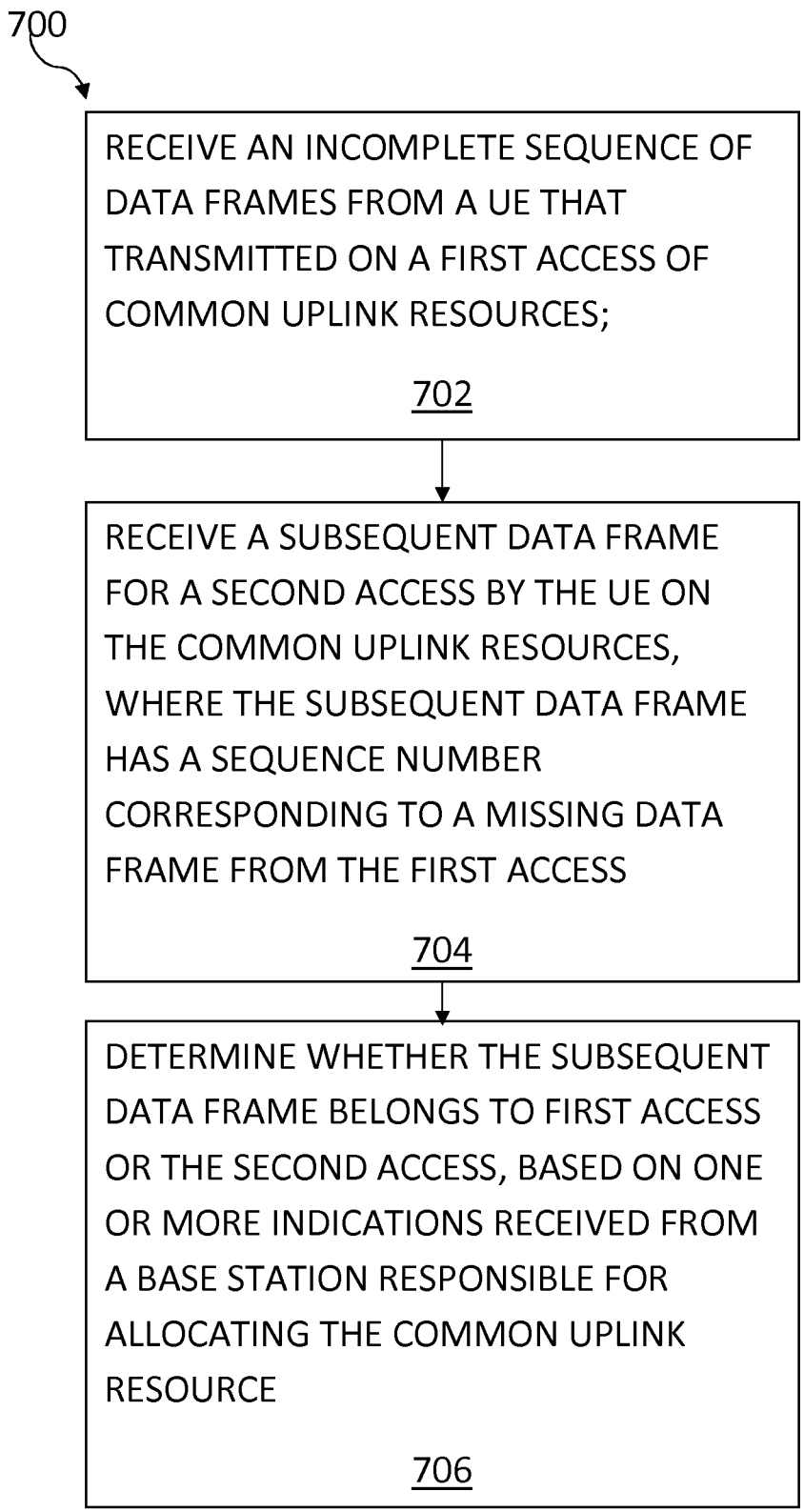
FIG. 7 is a flowchart illustrating another embodiment of a method in a RNC.

The method 700 shown in FIG. 7 includes receiving an incomplete sequence of data frames from a UE 22 that transmitted on a first access of common uplink resources (Block 702) and receiving a subsequent data frame for a second access by the UE 22 on the common uplink resources (Block 704). The subsequent data frame has a sequence number corresponding to a missing data frame from the first access. The method 700 further includes determining whether the subsequent data frame belongs to the first access or the second access, based on one or more indications received from a base station 18 responsible for allocating the common uplink resource (Block 706). The indications indicating new assignments and/or releases of the common uplink resource.

Figure 6:
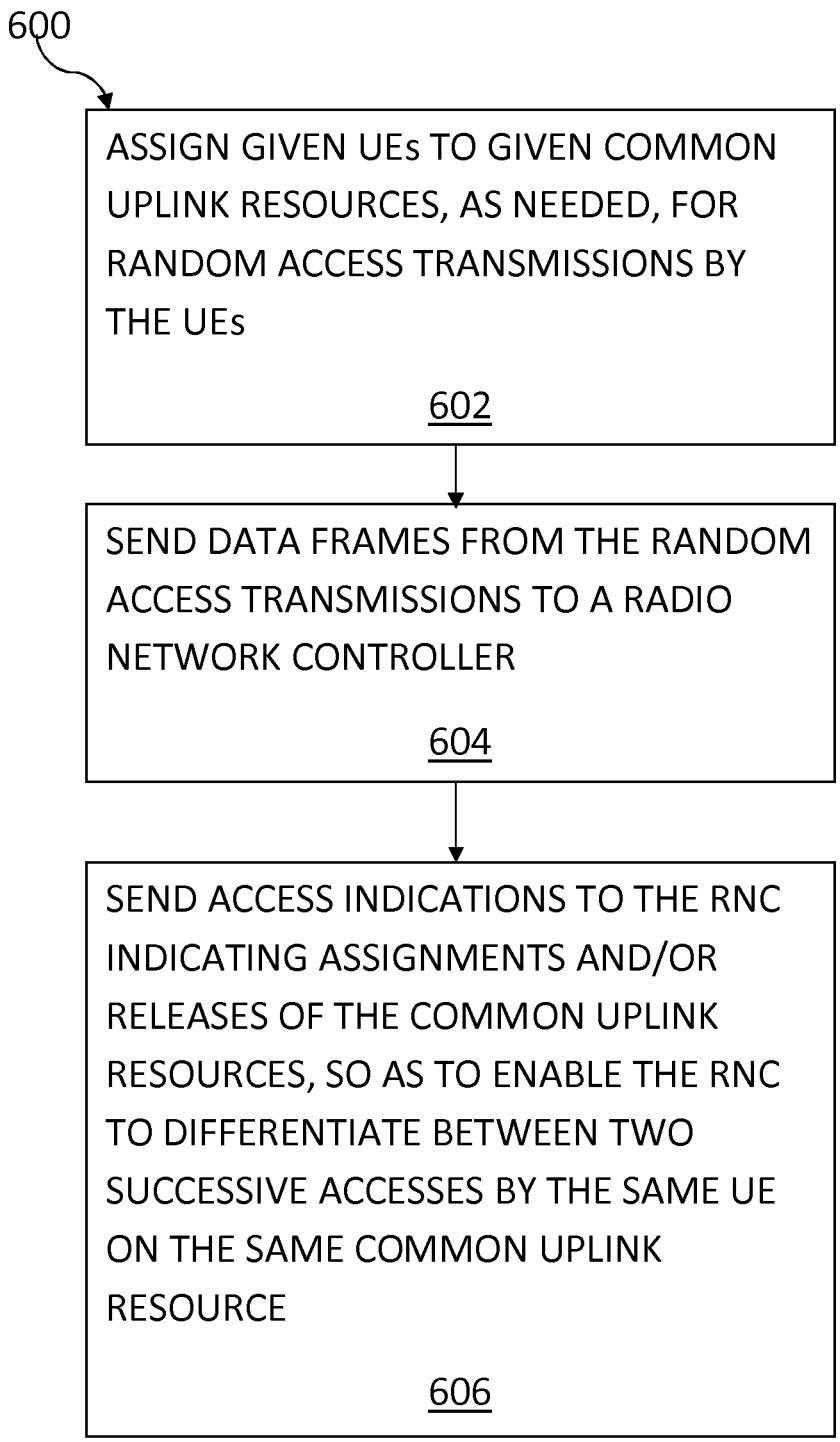
FIG. 6 is a flowchart illustrating an embodiment of a method in a base station.

FIG. 6 illustrates an example method 600, representing base-station side processing. The method includes assigning given UEs 22 to given common uplink resources, as needed, for random access transmissions by the UEs 22, (Block 602), sending data frames from the random access transmissions to the RNC 20 (Block 604), and sending access indications to the RNC 20 indicating assignments and/or releases of the common uplink resources, so as to enable the RNC 20 to differentiate between two successive accesses by the same UE 22 on the common E-DCH resources (Block 606).

Accordingly, the teachings herein solve the TSN re-ordering problem as recognized herein, thus yielding a better throughput when using EUL-FACH. In one or more embodiments, the reordering problem is solved by re-using existing information elements in the Iub Frame Protocol, with minimal impact on the existing standard. In embodiments wherein the access indications comprise index values identifying the different common uplink resources, the RNC 20 is provided with richer information regarding the actual usage characteristics on the common uplink resources.

Of course, the foregoing examples and accompanying illustrations are non-limiting.

What is claimed is:

1. A method of data processing at a Radio Network Controller, RNC, configured for operation in a wireless communication network, said method comprising:
receiving access indications from a base station, said access indications indicating allocations and/or releases of common uplink resources for random access transmissions by User Equipments, UEs, to the base station;
using the indications to differentiate between successive accesses on the common uplink resources by a same UE, and to correspondingly differentiate the processing of at least one missing data frame belonging to a first access of the common uplink resources and a data frame belonging to a second access, successive to the first access, and having Transmission Sequence Number, TSN same as the TSN of the missing data frame.

2. The method of claim 1, wherein the successive accesses comprise the successive first and second accesses on the common uplink resources and wherein the RNC is still waiting on a missing data frame from the first access by the UE, and wherein differentiating the processing of given data frames as belong to one or the other of the successive accesses comprises receiving, in the second access, the data frame having the same Transmission Sequence Number, TSN, as the missing data frame and recognizing from the access indications that the data frame belongs to the second access by the UE.

3. The method of claim 1, wherein using the indications to differentiate between the successive accesses on the common uplink resources, and to correspondingly differentiate the processing of the at least one missing data frame as belonging to the first or the second access comprises:
receiving an indication of resource release for the first access by the UE or an indication of resource assignment for the subsequent second access by the UE and correspondingly: sending any data frames buffered at the RNC for the first access on to a Radio Link Control, RLC, protocol layer for processing; flushing associated buffers at the RNC; and buffering data frames for the second access as needed, for subsequent transfer to the RLC protocol layer.

4. The method of claim 1, wherein receiving access indications comprises one or more of:
receiving a Propagation Delay, PD, value only once for each new access performed on the common uplink resources and therefore interpreting each new PD value received at the RNC for the common uplink resource as a new access indication;
receiving an explicit indication from the base station upon each release of common uplink resources; or receiving an index value identifying individual ones of the common uplink resources among a plurality of common uplink resources that are allocable for random accesses by the UEs, along with a flag or other corresponding value that indicates whether the common uplink resource is newly assigned or newly released.

5. The method of claim 1, wherein the wireless communication network comprises a UMTS network configured for High Speed Packet Access and the common uplink resources are common Enhanced Dedicated Channel, E-Dell, resources.

6. A Radio Network Controller, RNC, comprising one or more processors coupled to a memory where the memory comprises executable instructions to cause the one or more processors to:
receive access indications from a base station, said access indications indicating allocations and/or releases of common uplink resources for random access transmissions by User Equipments, UEs, to the base station;
use the indications to differentiate between successive accesses on the common uplink resources by a same UE, and to correspondingly differentiate the processing at least one missing data frame belonging to a first access of the common uplink resources and a data frame belonging to a second access, successive to the first access and having Transmission Sequence Number, TSN same as the TSN of the missing data frame.

7. A Radio Network Controller, RNC, comprising:
one or more processing circuits and one or more communication interfaces, wherein the one or more processing circuits are operatively associated with the one or more communication interface circuits and adapted to:
receive, via said one or more communication interface circuits, access indications from a base station, said access indications indicating allocations and/or releases of common uplink resources for random access transmissions by User Equipments, UEs, to the base station; and
use the indications to differentiate between successive accesses on the common uplink resources by a same UE, and to correspondingly differentiate the processing at least one missing data frame belonging to a first access of the common uplink resources and a data frame belonging to a second access, successive to the first access, and having Transmission Sequence Number, TSN same as the TSN of the missing data frame.

8. The RNC of claim 7, wherein the successive accesses comprise the successive first and second accesses on the common uplink resources and wherein differentiating the processing of given data frames as belong to one or the other of the successive accesses comprises, when the RNC is still waiting on a missing data frame from the first access by the UE, receiving, in the second access, the data frame having the same Transmission Sequence Number, TSN, as the missing data frame and recognizing from the access indications that the data frame belongs to the second access by the UE.

9. The RNC of claim 7, wherein using the indications to differentiate between the successive accesses on the common uplink resources, and to correspondingly differentiate the processing of the at least one missing data frame as belonging to the first or the second access comprises:
receiving an indication of resource release for the first access by the UE or an indication of resource assignment for the subsequent second access by the UE and correspondingly the one or more processing circuits further adapted to: send any data frames buffered at the RNC for the first access on to a Radio Link Control, RLC, protocol layer for processing; flush associated buffers at the RNC; and buffer data frames for the second access as needed, for subsequent transfer to the RLC protocol layer.

10. The RNC of claim 7, wherein receiving access indications comprises one or more of: receiving a Propagation Delay, PD, value only once for each new access performed on the common uplink resources and therefore interpreting each new PD value received at the RNC for the common uplink resource as a new access indication; receiving an explicit indication from the base station upon each release of common uplink resources; or receiving an index value identifying individual ones of the common uplink resources among a plurality of common uplink resources that are allocable for random accesses by the UEs, along with a flag or other corresponding value that indicates whether the common uplink resource is newly assigned or newly released.

11. The RNC of claim 7, wherein the wireless communication network comprises a UMTS network configured for High Speed Packet Access and the common uplink resources are common Enhanced Dedicated Channel, E-DCH, resources.

* * * * *